(12) United States Patent
Katayama

(10) Patent No.: US 8,467,104 B2
(45) Date of Patent: Jun. 18, 2013

(54) COLOR SELECTING METHOD, IMAGE PROCESSING METHOD, IMAGE PROCESSING APPARATUS, AND RECORDING MEDIUM

(75) Inventor: Takeshi Katayama, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 324 days.

(21) Appl. No.: 12/893,760

(22) Filed: Sep. 29, 2010

(65) Prior Publication Data

US 2011/0075223 A1    Mar. 31, 2011

(30) Foreign Application Priority Data

Sep. 30, 2009  (JP) ................................. 2009-228779

(51) Int. Cl.
- *H04N 1/60* (2006.01)
- *H04N 1/46* (2006.01)
- *G03F 3/08* (2006.01)
- *G06K 9/00* (2006.01)

(52) U.S. Cl.
USPC ........... 358/3.23; 358/1.9; 358/504; 358/518; 382/162; 382/167

(58) Field of Classification Search
USPC .................. 358/3.23, 1.9, 504, 518; 382/162, 382/167
See application file for complete search history.

(56) References Cited

U.S. PATENT DOCUMENTS

| | | | |
|---|---|---|---|
| 6,750,993 B1 * | 6/2004 | Shirai | 358/504 |
| 7,433,102 B2 * | 10/2008 | Takahashi et al. | 358/518 |
| 2001/0017719 A1 | 8/2001 | Asano | |
| 2006/0204084 A1 | 9/2006 | Matsuura | |
| 2007/0058186 A1 * | 3/2007 | Tanaka | 358/1.9 |

FOREIGN PATENT DOCUMENTS

| | | |
|---|---|---|
| JP | 2000-217007 A | 8/2000 |
| WO | 00/39749 A1 | 7/2000 |

OTHER PUBLICATIONS

Communication, dated Oct. 11, 2012, issued in corresponding EP Application No. 10180961.4, 8 pages.

* cited by examiner

*Primary Examiner* — Charlotte M Baker
(74) *Attorney, Agent, or Firm* — Sughrue Mion, PLLC

(57) ABSTRACT

A color selecting method, an image processing method, an image processing apparatus, and a recording medium are provided. Color comparing conditions for a color chart are designated, and image data are generated to print first, second and third color charts in which color patches having colors corresponding respectively to different variables of the designated color comparing conditions are disposed adjacent to each other.

11 Claims, 15 Drawing Sheets

FIG. 12A
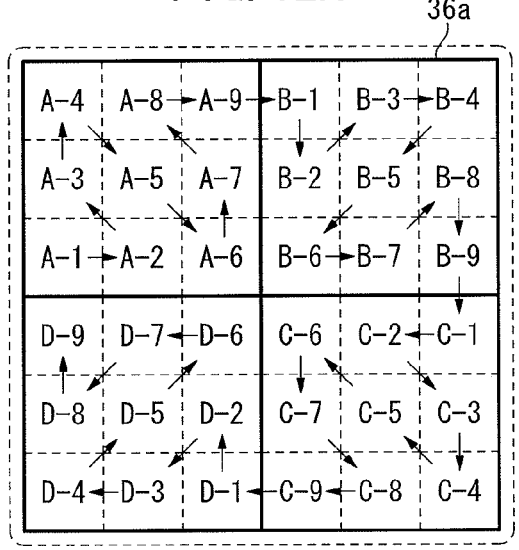
FIG. 12B
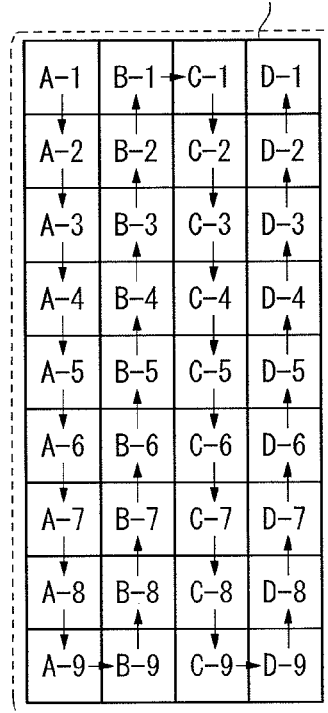
FIG. 12C
| No. | A | B | C | D |
|---|---|---|---|---|
| L* (dev) | 0 | −ΔL* | −2ΔL* | −3ΔL* |
136
FIG. 12D
|  | Δb* | 0 | −Δb* |
|---|---|---|---|
| Δa* | 1 | 3 | 4 |
| 0 | 0 | 2 | 5 | 8 |
| −Δa* | 6 | 7 | 9 |
a* (dev) →, b* (dev) ↓
138

FIG. 13A

|  |  |  |  |  |  |
|---|---|---|---|---|---|
| A-1 | A-3 | B-3→B-4 | →C-1 | C-3 |
| A-2 | A-4→B-1 | →B-2 | C-2 | C-4 |
| F-2←F-1 | ←E-4 | E-2 | D-2←D-1 |
| F-4←F-3 | E-3 | E-1←D-4←D-3 |
| G-1 | G-3 | H-3→H-4→I-1 | I-3 |
| G-2 | G-4→H-1→H-2 | I-2 | I-4 |

L* (dev) ↓
a* (dev) →

|  | ΔL* | 0 | -ΔL* |
|---|---|---|---|
| Δa* | A | C | D |
| 0 | B | E | H |
| -Δa* | F | G | I |

| No. | 1 | 2 | 3 | 4 |
|---|---|---|---|---|
| b* (dev) | 0 | -Δb* | -2Δb* | -3Δb* |

138

COLOR SELECTING METHOD, IMAGE PROCESSING METHOD, IMAGE PROCESSING APPARATUS, AND RECORDING MEDIUM

CROSS-REFERENCE TO RELATED APPLICATION

This application is based upon and claims the benefit of priority from Japanese Patent Application No. 2009-228779 filed on Sep. 30, 2009, of which the contents are incorporated herein by reference.

BACKGROUND OF THE INVENTION

1. Field of the Invention

The present invention relates to a color selecting method, an image processing method, an image processing apparatus, and a recording medium for printing a color chart having a plurality of color patches with a printing machine, and selecting one of the color patches of the color chart which is closest to a designated color.

2. Description of the Related Art

With significant advances in inkjet technology in recent years, it has become possible for inkjet printers to produce large color prints of high quality at high speeds. Inkjet printers are not only popular for private or home use, but nowadays also are widely used in commercial applications. Inkjet printers make it possible to print on POP (Point Of Purchase) posters, wall posters, large-size mediums such as outdoor advertisements and billboards, roll mediums, and thick hard mediums.

There are a wide variety of print mediums (hereinafter also referred to as "mediums") available for use in prints to meet various commercial demands. For example, such print mediums include paper mediums such as synthetic paper, thick paper, aluminum-evaporated paper, etc., resin mediums such as those made of vinyl chloride, PET, etc., and tarpaulin paper made of woven fiber cloth with synthetic resin films applied to both surfaces thereof.

Since prints for use as advertisements (print mediums which have been printed) are expected to be effective to arouse consumer's motivation to buy advertised products through visual sensations of the consumer, the color finish of such prints is of particular importance. Heretofore, there have been disclosed various color matching technologies such as a method of generating an ICC (International Color Consortium) profile, a method of adjusting a designated color, etc. as a print color managing means. Such color matching technologies are applicable not only to inkjet printers but also to all types of digital printers, including those based on electrophotographic and thermosensitive principles, together with their peripheral devices across the board.

The method of adjusting a designated color referred to above comprises a method of making fine color adjustments of an area of interest in an image in order to bring the color into substantial conformity with a given color (designated color) designated by a color sample of color chips, while maintaining the color balance of the image as a whole. There have been disclosed various methods of adjusting a designated color.

A method of selecting a plurality of candidate colors may be carried out by gradually changing the values of variables that can be controlled for print. Examples of such variables include device-depending data such as C, M, Y, K data, R, B, G data, etc.

For example, Japanese Laid-Open Patent Publication No. 200-217007 discloses a color selecting method of bringing the impression of a designated color displayed on a display device and the impression of a color printed by a printing machine into conformity with each other. Specifically, Japanese Laid-Open Patent Publication No. 2000-217007 discloses a display window displayed on the display device where the displayed color is changeable and a printed color chart of 27 colors, which are thought to be close to a designated color that is displayed (see FIGS. 4 and 5 of Japanese Laid-Open Patent Publication No. 2000-217007). The color chart is made of color patches printed in colors having different C, M, Y, K values.

In order to print a color closest to a designated color using a printing machine where the device-dependent data represent C, M, Y, K, it is necessary to determine optimum values for four variables of C, M, Y, K.

If a designated color falls outside the range of the gamut of a printing machine, it is physically impossible to reproduce the designated color. In such a case, the designated color is replaced with a certain color (i.e., a color closest to the designated color) within the range of the gamut, and a gamut mapping process is carried out taking into account the color balance of the overall image. To this end, it is necessary to select an optimum gamut mapping process (hereinafter also referred to as "mapping process").

If an observational environment in which a print is formed and an observational environment in which the print is displayed are different from each other, then the difference between the observational environments have to be taken into consideration. Specifically, the types of observational light sources, the types of background colors, etc. have to be considered as variable factors, and the colors of color patches to be printed on a color chart need to be appropriately selected. In addition, selected colors may be different depending on color preference of each person.

Thus, the manner in which colors are presented varies depending on controllable variables (device-dependent data or mapping processes), and the manner in which colors are seen varies depending on the observational environment. For printing a color chart taking all the above items into account, the number of color patches to be printed needs to be increased because it is necessary to widen the color presentation range for increasing color choices and it is necessary to attain color resolution for more strict color selection.

For example, if the values on the axes of L*, a*, b* are to be independently selectable in 10 stages, then $10^3 = 1000$ color patches are required. As the number of color patches increases, the burden on the operator for selecting colors also increases and the overall size of a color chart including those color patches becomes larger. Therefore, the efficiency with which the operator works is lowered, making it difficult for the operator to select desired colors.

SUMMARY OF THE INVENTION

It is an object of the present invention to provide a color selecting method, an image processing method, an image processing apparatus, and a recording medium which allow the operator to select colors efficiently and easily without an excessive increase in the number of color patches on a color chart.

According to the present invention, there is provided a color selecting method of printing a color chart having a plurality of color patches with a printing machine and selecting one of the color patches whose color is closest to a designated color from the color chart.

The color selecting method comprises the steps of designating a color comparing condition for the color chart, and generating image data to print the color chart in which color patches having colors corresponding respectively to different variables of the designated color comparing conditions are disposed adjacent to each other.

The color comparing condition for the color chart refers to various conditions for comparing the colors of the color patches on the color chart to see if the colors are acceptable or not, and includes not only variables such as C, M, Y, K values, color values L*, a*, b*, etc., but also a type of observational light source, a gamut mapping process, etc. The type of observational light source includes not only the general name of a light source such as a tungsten lamp, a fluorescent lamp (F2, F6, F7, or the like), daylight D65, or the like, but also various data such as a color temperature, a spectral radiance distribution, etc.

With the above arrangement, appropriate color comparing conditions can be designated depending on the situation in which the color selecting method is performed, thereby allowing the operator to select a color efficiently and easily.

Preferably, the color comparing condition includes the type of observational light source. The operator is thus able to select a color which is different under a different observational light source.

Preferably, the color comparing condition includes a background color. The operator is thus able to select a color in view of a change of spectral sensitivity characteristics of vision depending on the background color (so-called "chromatic adaptation).

Preferably, the color comparing condition includes lightness, saturation, and hue.

Preferably, the color comparing condition includes a gamut mapping process. The operator is thus able to select a color within the range of the gamut efficiently in a manner acceptable to the operator even if the designated color is a color outside the gamut.

Preferably, the step of generating image data generates the image data such that the color patches having colors gradually changed are disposed in a zigzag pattern. Therefore, the operator can continuously track down the colors of the color patches as they change and can easily select a color patch whose color is closest to the designated color.

Preferably, the step of generating image data generates the image data so as to include a guide line for observing the color patches along a route according to the zigzag pattern. The guide line allows the operator to easily and efficiently track down the colors of the color patches as they change.

Preferably, the one of the color patches whose color is closest to the designated color is selected under a predetermined observational light source from those of the color patches in the color chart which correspond to the type of the predetermined observational light source.

Preferably, the color selecting method further comprises the steps of printing the color chart after a color conversion thereof depending on a predetermined light source has been performed, and observing the color chart through color correction optical filters under an observational light source different from the predetermined light source, and selecting the one of the color patches whose color is closest to the designated color and selecting one of the color correction optical filters. The appearance of the colors of the color patches can thus freely be adjusted.

Preferably, the step of selecting one of the color correction optical filters selects the one of the color correction optical filters by evaluating the saturation of an achromatic solid area on the color chart, the achromatic solid area being provided separately from the color patches.

According to the present invention, there is also provided an image processing method comprising the steps of designating a color comparing condition for a color chart having a plurality of color patches, generating image data to print the color chart in which color patches having colors corresponding respectively to different variables of the designated color comparing condition are disposed adjacent to each other, printing the color chart with a printing machine based on the generated image data, entering color values of a designated color, and converting colors of a print to be produced by the printing machine, based on color values of one of the color patches whose color is selected as a color closest to the designated color from the printed color chart and based on the entered color values of the designated color.

According to the present invention, there is also provided an image processing method using the color selecting method described above, comprising the steps of converting color values of the selected one of the color patches whose color is closest to the designated color into color values under the observational light source different from the predetermined light source, based on color information of the selected one of the color correction optical filters, entering color values of the designated color, and converting colors of a print to be produced by the printing machine, based on the color values under the observational light source different from the predetermined light source and based on the entered color values of the designated color.

According to the present invention, there is further provided an image processing apparatus comprising a designator for designating a color comparing condition for a color chart having a plurality of color patches, a data generator for generating image data to print the color chart in which color patches having colors corresponding respectively to different variables of the color comparing condition designated by the designator are disposed adjacent to each other, a print controller for controlling a printing machine to print the color chart based on the image data generated by the data generator, and a color converter for converting colors of a print to be produced by the printing machine, based on color values of one of the color patches whose color is selected as a color closest to the designated color from the printed color chart and based on the entered color values of the designated color.

According to the present invention, there is further provided an image processing apparatus comprising a patch color converter for converting color values of the one of the color patches whose color is closest to the designated color and which is selected by the color selecting method described above, into color values under the predetermined light source, based on color information of the selected one of the color correction optical filters, and a color converter for converting colors of a print to be produced by the printing machine, based on the color values under the observational light source different from the predetermined light source which are converted by the patch color converter and based on the entered color values of the designated color.

According to the present invention, there is also provided a recording medium storing a program for enabling a computer to perform the functions of designating a color comparing condition for a color chart, generating image data to print the color chart in which color patches having colors corresponding respectively to different variables of the designated color comparing condition are disposed on the image data.

With the color selecting method, the image processing method, the image processing apparatus, and the recording medium according to the present invention, color comparing conditions for the color chart are designated, and image data are generated to print the color chart in which color patches having colors corresponding respectively to different variables of the designated color comparing conditions are disposed adjacent to each other. Consequently, appropriate color comparing conditions can be designated depending on the situation in which the color selecting method is carried out, thereby allowing the operator to select a color efficiently and easily.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 12A through 12D are front elevational views of a first color chart according to a first modification of the embodiment;

FIGS. 13A through 13C are front elevational views of a first color chart according to a second modification of the embodiment;

DESCRIPTION OF THE PREFERRED EMBODIMENTS

Color selecting methods according to preferred embodiments of the present invention in relation to an image processing apparatus and a printing system for carrying out the color selecting methods, will be described in detail below with reference to the accompanying drawings.

Figure 1:
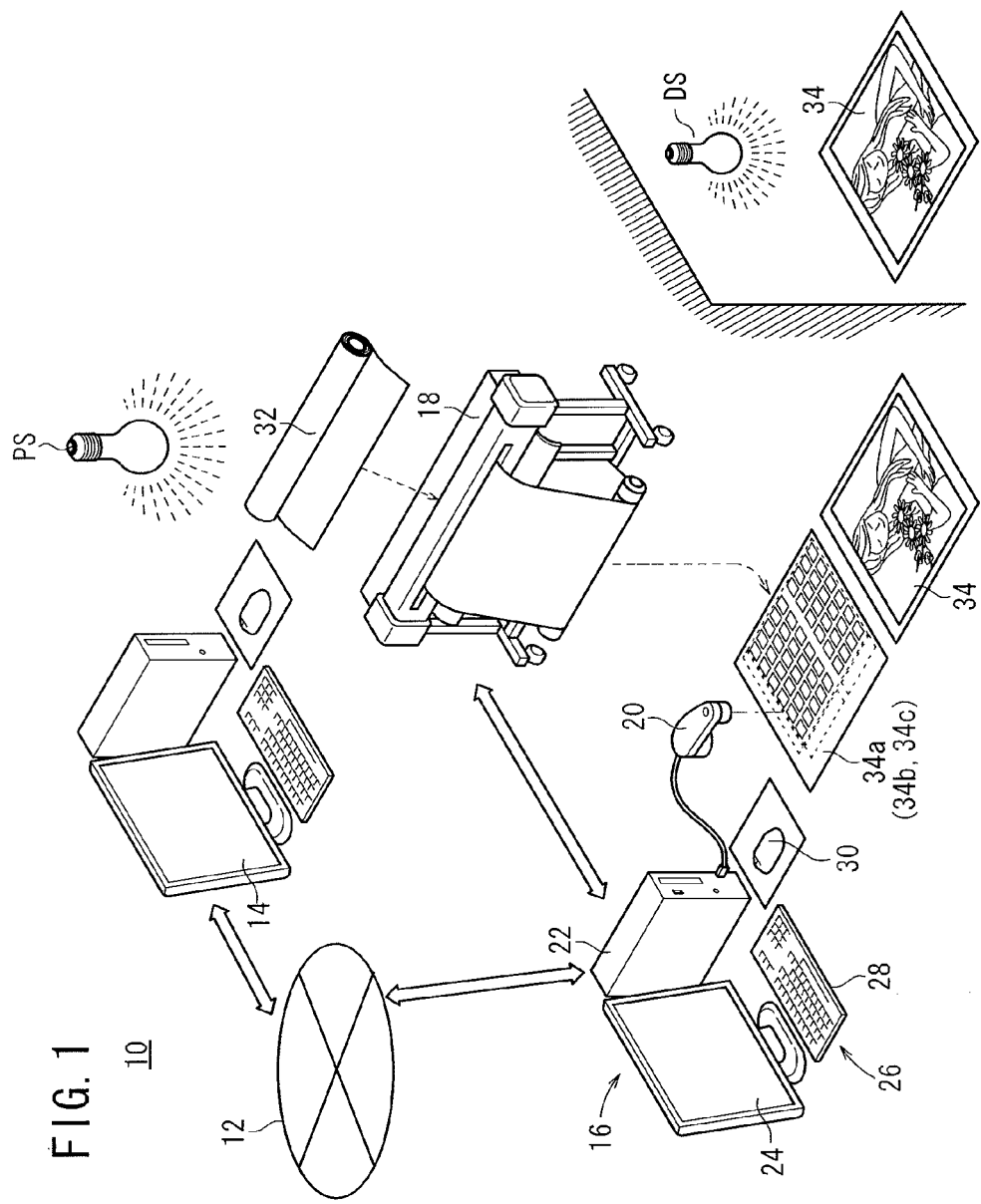
FIG. 1 is a perspective view of a printing system incorporating an image processing apparatus according to an embodiment of the present invention.

FIG. 1 shows in perspective a printing system 10 incorporating an image processing apparatus 16 according to an embodiment of the present invention.

As shown in FIG. 1, the printing system 10 basically comprises a LAN 12, an editing apparatus 14, an image processing apparatus 16, a printing machine 18, and a colorimeter 20.

The LAN 12 makes up a network constructed according to communication standards such as Ethernet (registered trademark) or the like. The editing apparatus 14 and the image processing apparatus 16 are connected to each other through the LAN 12 by a wired or wireless link.

The editing apparatus 14 is capable of editing the arrangement of color images made up of characters, figures, pictures, photos, etc. on each of pages to be printed. The editing apparatus 14 generates electronic manuscripts in a page description language (hereinafter referred to as "PDL"), e.g., 8-bit image data in color channels of four colors (C, M, Y, K) or three colors (R, G, B).

PDL refers to a language, which is descriptive of image information including format information, positional information, color information (including density information), etc., of characters, figures, etc., in a "page" that serves as an output unit for printing, displaying, or the like. Known types of PDL include PDF (Portable Document Format according to ISO32000-1:2008), PostScript (registered trademark) of Adobe Systems, and XPS (XML Paper Specification).

A color scanner, not shown, is connected to the editing apparatus 14. The color scanner is capable of optically reading a color original set in position. Therefore, the editing apparatus 14 can acquire color image data from the color scanner, based on the color original read thereby, as the image data of an electronic manuscript.

The image processing apparatus 16 converts the color image data of an electronic manuscript described by PDL and acquired from the editing apparatus 14 into raster image data (e.g., a type of bitmap image data), performs a desired image processing process, e.g., a color conversion process, an image scaling process, an image arranging process, etc. on the raster image data, converts the processed raster image data into a print control signal that matches the printing process of the printing machine 18, and sends the print control signal to the printing machine 18.

The image processing apparatus 16 comprises a main unit 22 including a CPU, a memory, etc., a display device 24 for displaying color images, and an input device 26 serving as an input unit and including a keyboard 28 and a mouse 30. The colorimeter 20 is connected to the main unit 22 of the image processing apparatus 16.

The printing machine 18 comprises an inkjet printing apparatus for producing a color image based on a combination of standard inks of colors C, M, Y, K (process colors), together with optional inks of light colors such as LC, LM, etc. and W (white). The printing machine 18 controls the propulsion of inks onto a print medium 32 (rolled non-printed medium in FIG. 1) based on a print control signal received from an external apparatus, e.g., the image processing apparatus 16, in order to print a color image on the print medium 32, thereby producing a print 34 which may include a first color chart 34a, a second color chart 34b, and a third color chart 34c as types of the print 34.

The print medium 32 may comprise a paper medium such as synthetic paper, thick paper, aluminum-evaporated paper, or the like, a resin medium such as vinyl chloride, PET, or the like, or tarpaulin paper, or the like.

The colorimeter 20 measures the color values of an object to be measured. The color values refer to not only tristimulus values X, Y, Z, the coordinates L*, a*, b* of a uniform color space, etc., but also a distribution of optical material characteristic values (hereinafter referred to as "spectral data") with respect to wavelengths, e.g. a spectral radiance distribution, a spectral sensitivity distribution, a spectral reflectivity, or a spectral transmittance.

The print 34 thus produced is exhibited in a desired location under a light source DS (another observational light source) whose spectral radiance distribution is different from a light source PS (prescribed observational light source) of the printing system 10, and observed by an observer.

Figure 2:
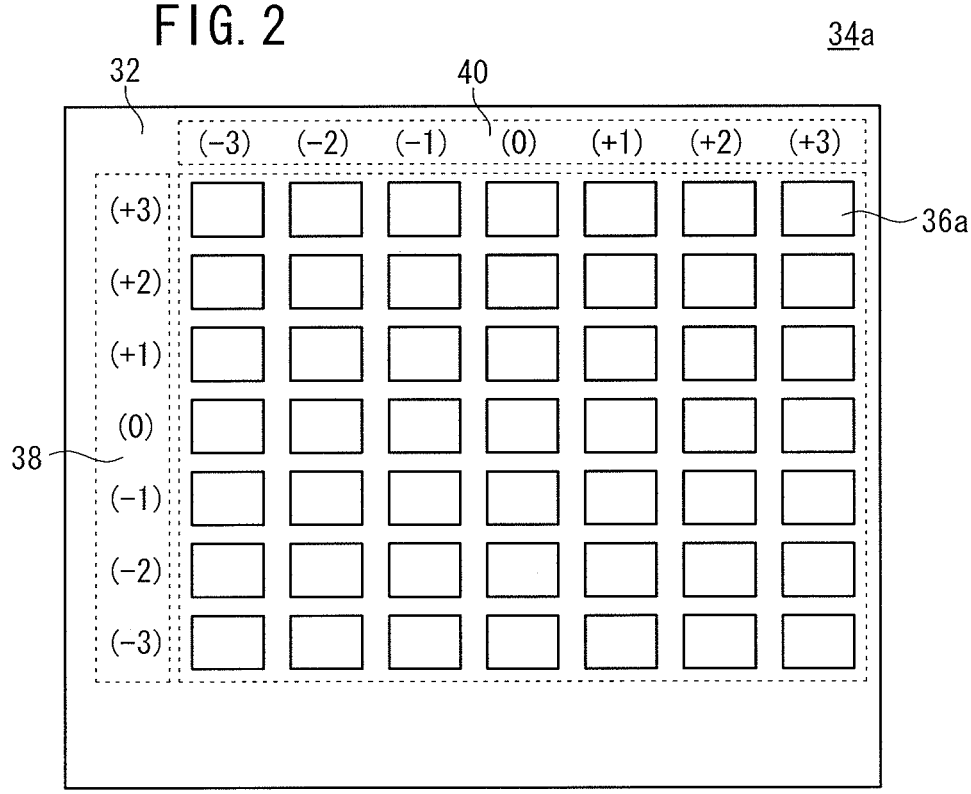
FIG. 2 is a front elevational view of a first color chart according to the embodiment.

FIG. 2 is a front elevational view of the first color chart 34a according to the present embodiment.

The first color chart 34a shown in FIG. 2 comprises 49 color patches 36a made up of different colors which are substantially identical in shape, and row numbers 38 and column numbers 40 for identifying the positions of the color patches 36a along the directions of rows and columns, all of which are printed on the print medium 32.

The color patches 36a are arranged in a matrix having 7 vertical columns and 7 horizontal rows, the color patches 36a being spaced from each other by given intervals. Colors of the respective color patches 36a are set to given values in a range of signal levels of C, M, Y, K values (a percentage range from 0% to 100% or a 8-bit gradation range from 0 to 255).

The row numbers 38, which serve as identification information, represent a vertical string of characters ranging from (+3) to (−3) positioned in alignment with and at the left of the respective rows of the color patches 36a. The column numbers 40, which also serve as identification information, represent a horizontal string of characters ranging from (−3) to (+3) positioned in alignment with and at the top of the respective columns of the color patches 36a.

Figure 3:
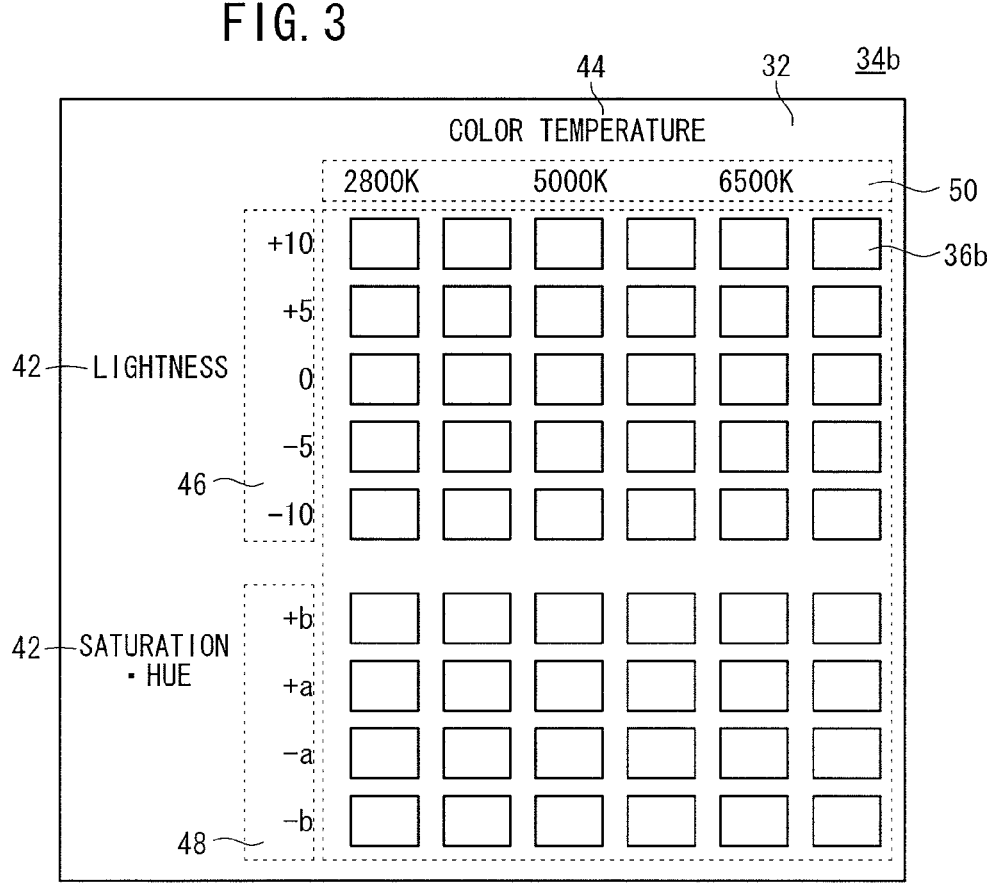
FIG. 3 is a front elevational view of a second color chart according to the embodiment.

FIG. 3 is a front elevational view of the second color chart 34b according to the present embodiment.

The second color chart 34b shown in FIG. 3 comprises 54 color patches 36b made up of different colors which are substantially identical in shape, a string of characters 42 representing "LIGHTNESS" and "SATURATION-HUE", a string of characters 44 representing "COLOR TEMPERATURE", a string of numbers 46, a string of characters 48, and a string of characters 50 for identifying the positions of the color patches 36b along the directions of rows and columns, all of which are printed on the print medium 32.

The color patches 36b are divided into upper and lower groups. In the upper group, the color patches 36b are arranged in a matrix having 6 vertical columns and 5 horizontal rows, the color patches 36a being spaced from each other by given intervals. In the lower group, the color patches 36b are arranged in a matrix having 6 vertical columns and 4 horizontal rows, and the color patches 36b being spaced from each other by given intervals.

The string of numbers 46, which serve as identification information represent, a vertical string of characters ranging from +10 to −10 positioned in alignment with and at the left of the respective rows of the color patches 36b. The string of characters 48, which also serve as identification information, represent a vertical string of characters ranging from +b to −b positioned in alignment with and at the left of the respective rows of the color patches 36b. The string of characters 50, which also serve as identification information, represent a horizontal string of characters ranging from 2800K to 6500K positioned in alignment with and at the top of the respective columns of the color patches 36b.

Figure 4:
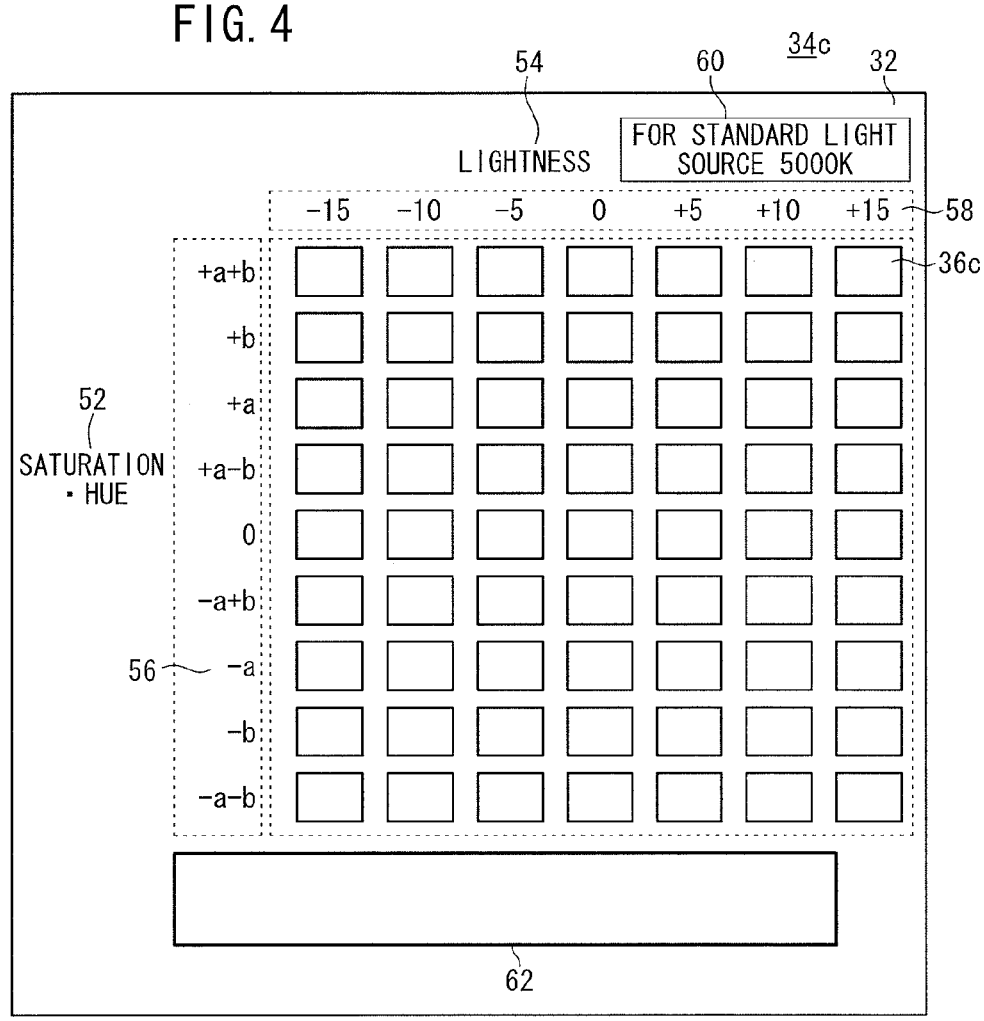
FIG. 4 is a front elevational view of a third color chart according to the embodiment.

FIG. 4 is a front elevational view of the third color chart 34c according to the present embodiment.

The third color chart 34c shown in FIG. 4 comprises 63 color patches 36c made up of different colors which are substantially identical in shape, a string of characters 52 representing "SATURATION-HUE", a string of characters 54 representing "LIGHTNESS", a string of characters 56 and a string of numbers 58 for identifying the positions of the color patches 36c along the directions of rows and columns, a color temperature indicating column 60 showing the color temperature of a light source, and a gray patch 62 (solid area), all of which are printed on the print medium 32.

The color patches 36c are arranged in a matrix having 7 vertical columns and 9 horizontal rows, the color patches being spaced from each other by given intervals.

The string of characters 56, which serve as identification information, represent a vertical string of characters ranging from +a+b to −a−b positioned in alignment with and at the left of the respective rows of the color patches 36c. The string of numbers 58, which also serve as identification information, represent a horizontal string of characters ranging from −15 to +15 positioned in alignment with and at the top of the respective columns of the color patches 36c.

The color temperature indicating column 60 is disposed in an upper right region of the print medium 32, and shows "FOR STANDARD LIGHT SOURCE 5000K". The gray patch 62 is disposed in a lower region of the print medium 32, and is of a rectangular shape which is elongate horizontally on the print medium 32. The gray patch 62 is printed in an achromatic color and has a uniform density.

Figure 5:
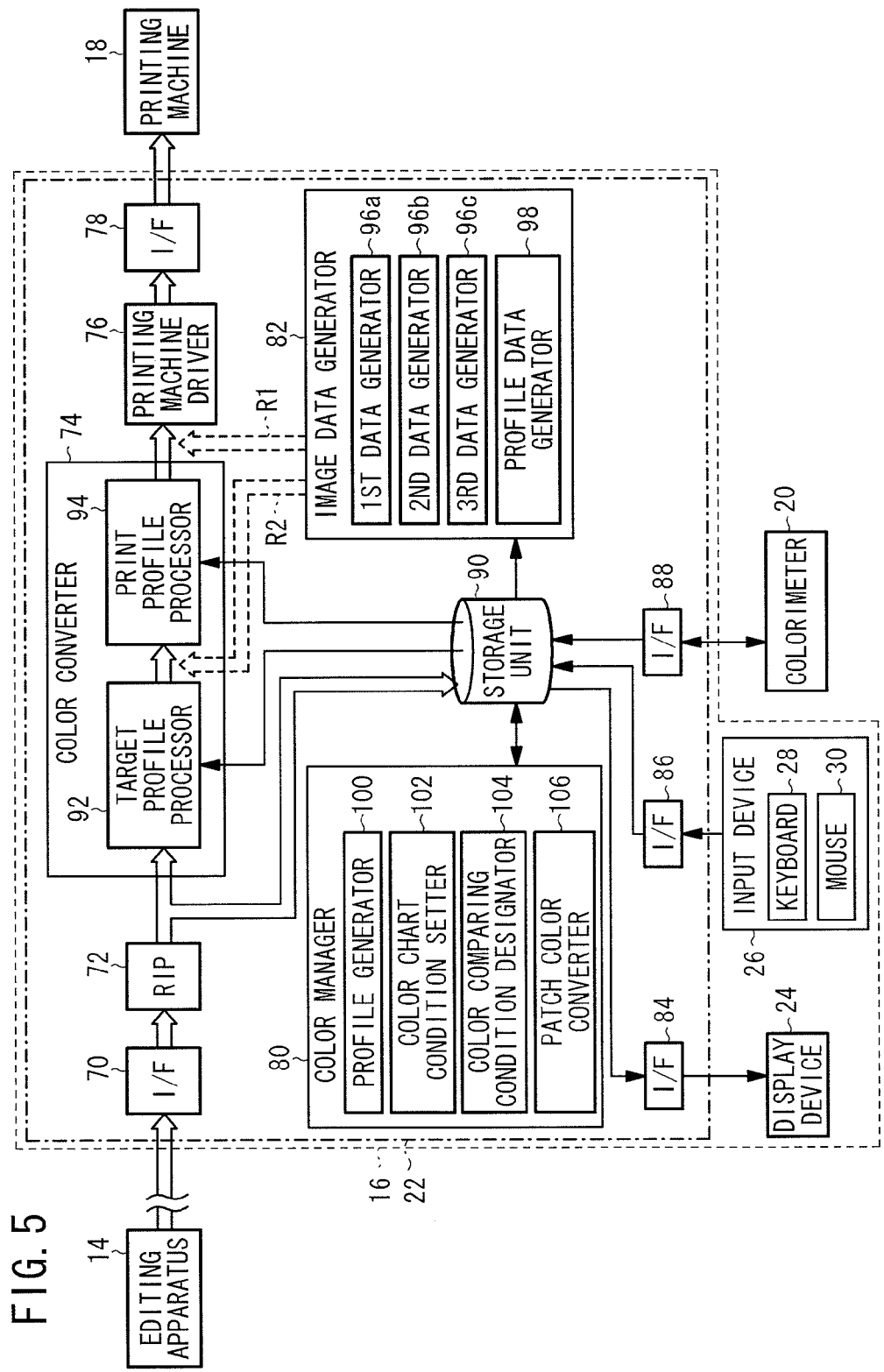
FIG. 5 is a functional block diagram of the image processing apparatus according to the embodiment.

FIG. 5 is a functional block diagram of the image processing apparatus 16 according to the present embodiment. In FIG. 5, an electronic manuscript is supplied along the directions indicated by outlined solid-line arrows, color-chart image data is supplied along the directions indicated by the outlined broken-line arrows, and various other data is supplied along the directions indicated by solid-line arrows.

As shown in FIG. 5, the main unit 22 of the image processing apparatus 16 includes an I/F 70 for entering an electronic manuscript supplied from the editing apparatus 14, an RIP (Raster Imaging Processor) 72 for converting the PDL format of the electronic manuscript supplied from the I/F 70 into a raster format, a color converter 74 for performing a color converting process on the converted C, M, Y, K values (or R, G, B values) of the electronic manuscript from the RIP 72 in order to produce image data made up of new C, M, Y, K values, a printing machine driver (print controller, print control means) 76 for converting the image data of the new C, M, Y, K values produced by the color converter 74 into a print control signal (ink propulsion control data) that matches the printing process of the printing machine 18, and an I/F 78 for outputting the print control signal generated by the printing machine driver 76 to the printing machine 18.

The main unit 22 also includes a color manager 80 for managing profiles of different printing machines 18, an image data generator (image generating means) 82 for generating image data to print the first, second, and third color charts 34a, 34b, 34c or a profile color chart, not shown, an I/F 84 for connection to the display device 24, an I/F 86 for connection to the input device 26 including the mouse 28 and the keyboard 30, and an I/F 88 for connection to the colorimeter 20.

The main unit 22 also includes a storage unit 90 for storing various data supplied from various components of the main unit 22 and for supplying stored data to various components of the main unit 22. The storage unit 90 is connected to the RIP 72, the color converter 74, the color manager 80, the image data generator 82, the I/F 84, the I/F 86, and the I/F 88.

The color converter 74 comprises a target profile processor 92 for converting device-dependent data into device-independent data, and a print profile processor 94 for converting device-independent data into device-dependent data. The device-dependent data refer to data defined in terms of C, M, Y, K values, R, G, B values, or the like, for appropriately driving various devices. The device-independent data refer to data defined in terms of a display system such as an HSL system, an HSB system, a CIELAB coordinate system, a CIELUV coordinate system, an XYZ system, or the like.

The image data generator 82 comprises a first data generator (data generator) 96a for generating image data in order to print the first color chart 34a, a second data generator (data generator) 96b for generating image data in order to print the second color chart 34b, a third data generator (data generator) 96c for generating image data in order to print the third color chart 34c, and a profile data generator 98 for generating image data in order to print the profile color chart (not shown).

The color manager 80 comprises a profile generator 100 for generating profiles for respective printing machines 18, a color chart condition setter (setter) 102 for setting color chart conditions (reference colors and color difference intervals) to be described later, a color comparing condition designator (designator, designating means) 104 for selecting color comparing conditions including not only C, M, Y, K values, color values L*, a*, b*, color temperatures, but also a gamut mapping process, etc., and a patch color converter 106 for converting the color of a color patch 36c which is selected based on color information of a color correction optical filter to be described later.

The RIP 72 can perform various image processing processes including an image scaling process depending on the resolution, etc. of the printing machine 18 and a rotating and inverting process depending on a printing format when an electronic manuscript is converted into raster data.

The printing machine driver 76 generates ink propulsion control data corresponding to ink colors (C, M, Y, K, LC, LM, or W) from C, M, Y, K values. The ink propulsion control data are data for appropriately controlling the ink propulsion of the printing machine 18 (ink ejection ON/OFF, ink dot diameters, etc.). The printing machine driver 76 may generate the ink propulsion control data according to a known algorithm such as a dither matrix method, an error diffusion method, or the like, although it requires conversion from an 8-bit multiple-gradation image into a low-gradation image such as a binary image.

The target profile processor 92 or the print profile processor 94 is capable of correcting profiles depending on a print mode of the printing machine 18. The print mode refers to various print settings such as the number of nozzles of the print head, the timing (unidirectional/bidirectional) of ink ejection at the time the print head scans, the number of passes, the number and type of inks used on the printing machine 18, an algorithm for generating ink ejection control data, etc.

The main unit 22 has a controller (not shown) comprising a CPU, etc., for controlling all of the image processing processes described above. More specifically, the controller controls not only operation of various components of the main unit 22, e.g., reading data from and writing data in the storage unit 90, but also transmission of display control signals via the I/F 84 to the display device 24 and acquisition of colorimetric data from the colorimeter 20 via the I/F 88.

The image processing apparatus 16 according to the present embodiment is constructed basically as described above. The image processing processes or functions described above can be performed according to application software (programs) stored in the storage unit 90 which operates on basic software (operating system).

The programs may be recorded in a computer-readable recording medium, and may be read from the medium into a computer system and executed thereby. The term "computer system" includes an OS and hardware including peripheral devices. The computer-readable recording medium comprises a portable storage medium such as a flexible disk, a magnetooptical disk, a ROM, a CD-ROM, or the like, or a storage unit such as a hard disk or the like incorporated into the computer system. The computer-readable recording medium also includes a medium for dynamically holding programs for a short period of time, such as a communication line for transmitting programs via a network such as the Internet or the like or via a communication channel such as a telephone line, or a memory for holding programs for a certain period of time such as a volatile memory in a computer system which serves as a server or a client in a network environment.

Figure 6:
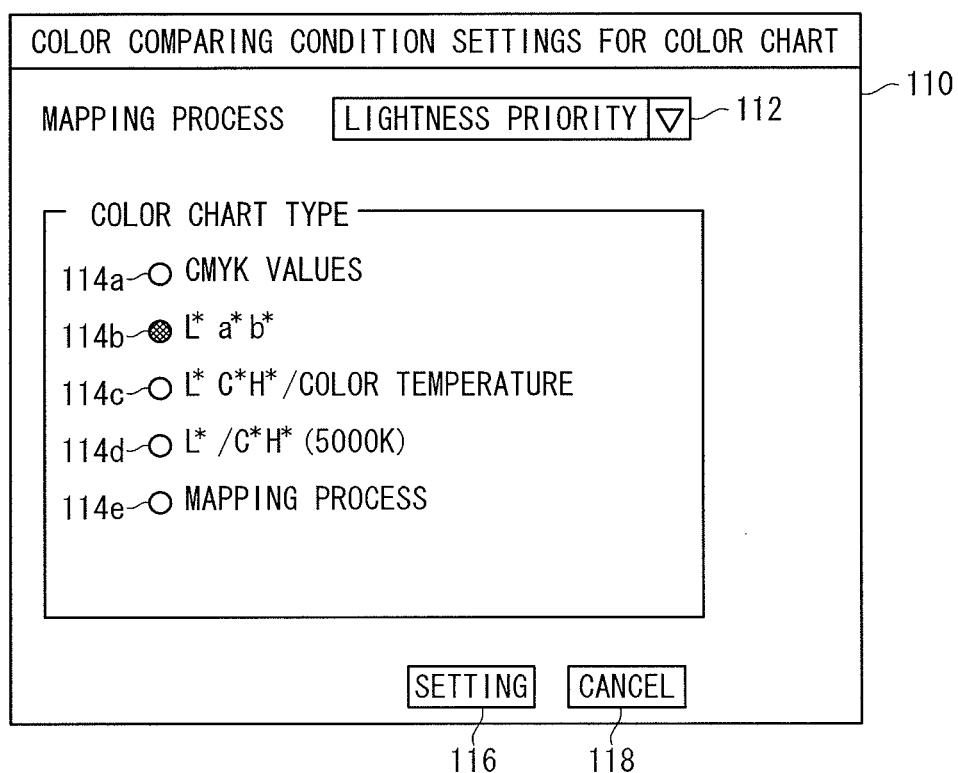
FIG. 6 is a view showing by way of example a setting screen for setting color chart color comparing conditions according to the embodiment.

FIG. 6 is a view showing by way of example a setting screen for setting color comparing conditions for the first, second, and third color charts 34a, 34b, 34c according to the embodiment.

The setting screen, denoted by 110, includes a pull-down menu 112, five radio buttons 114a, 114b, 114c, 114d, 114e, and buttons 116, 118 displaying "SETTING", "CANCEL", respectively, which are successively arranged from an upper portion to a lower portion of the setting screen 110.

The setting screen 110 also includes a string of characters "MAPPING PROCESS" on the right side of the pull-down menu 112. When the operator operates the mouse 30 in a certain way, the setting screen 110 displays a selection column, not shown, beneath the pull-down menu 112.

The setting screen 110 also includes letters "CMYK VALUES", "L*a*b*", "L*C*H*/COLOR TEMPERATURE", "L*/C*H*(5000K)", "MAPPING PROCESS" displayed on the right sides of the respective radio buttons 114a, 114b, 114c, 114d, 114e.

The printing system 10 according to the present embodiment is basically constructed as described above. Operation of the printing system 10 will be described below.

Figure 7:
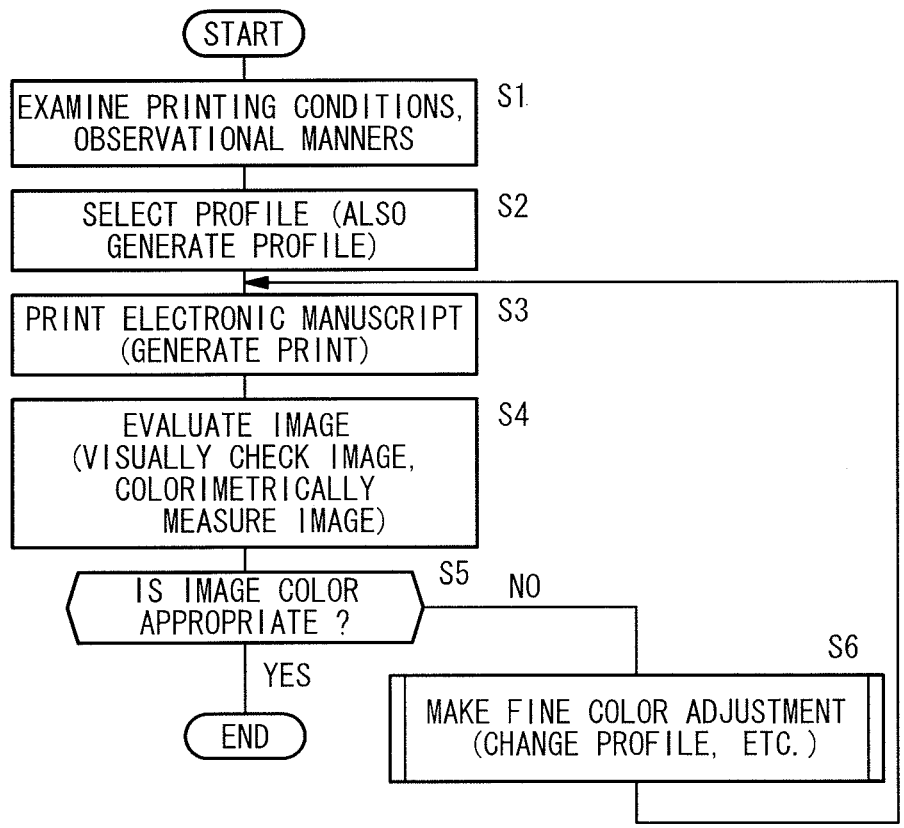
FIG. 7 is a flowchart of a sequence for producing a print of appropriate color with the printing system according to the embodiment.

FIG. 7 is a flowchart of a sequence for producing a print 34 of appropriate color with the printing system 10 according to the embodiment. Operation of the printing system 10 will be described in detail below with reference to FIG. 1.

The operator examines printing conditions and observational manners of a print 34 to be produced (step S1). The printing conditions refer to the type of the printing machine 18 to be used to produce the print 34, the type of the print medium 32, and the print mode described above. The observational manners refer to the attributes (type, spectral data) of a light source DS serving as an observational light source for the print 34 and also the type of the image on the print 34 to be observed. The type of the image may represent a reflective image (an image generated using a reflective light source as a main light source), a transmissive image (an image generated using a transmissive light source as a main light source), or a mixed image (an image generated using reflective and transmissive light sources as main light sources).

Then, the operator selects a profile suitable for the printing machine 18 (step S2). Normally, a target profile or a print profile is stored in the storage unit 90. If a profile suitable for the printing machine 18 is not registered, i.e., is not stored in the storage unit 90, then a print profile can be generated separately.

Then, an electronic manuscript is printed using the printing machine 18, thereby producing a color print 34 (step S3). The print 34 may be laminated by a laminating apparatus, not shown, in order to provide a protective film over the image surface of the print 34. The color image of the print 34 can thus be protected for better abrasion resistance and toughness.

Then, the operator evaluates the color of the color image of the print 34 (step S4), and determines whether or not the color of the image is appropriate (step S5). The operator may evaluate the color of the image so as to determine whether desired hues are obtained or not, either by visually checking the image based on the observation of an overall or partial appearance of the image, or by obtaining a colorimetric value of a certain area of the print 34 with the colorimeter 20 and thereby determining whether or not the obtained colorimetric value falls within a desired range.

If, as a result of the image evaluation, the operator judges that the color of the image of the print 34 is not suitable, then the operator changes the profile or the like in order to make fine adjustments of the color of the image (step S6). More specifically, the operator may reset the profile or regenerate a profile or may make a fine adjustment of the profile, (i.e., correction of the presently set profile), or may correct print data of the electronic manuscript.

Thereafter, an electronic manuscript is printed and the color of the image thereof is evaluated repeatedly (steps S3 through S6) until a print 34 of desired color is obtained.

An image processing sequence of the image processing apparatus 16 for printing an electronic manuscript (step S3) will be described in detail below with reference to FIG. 5.

When an electronic manuscript in PDL format supplied from the editing apparatus 14 is input to the image processing apparatus 16 via the LAN 12 and the I/F 70, the electronic manuscript is converted into 8-bit C, M, Y, K raster data (device-dependent image data) by the RIP 72. The 8-bit C, M, Y, K raster data are then converted into L*, a*, b* data (device-independent image data) by the target profile processor 92. The L*, a*, b* data are then converted into C, M, Y, K value data (device-dependent image data) by the print profile processor 94. The C, M, Y, K value data are then converted into a print control signal (ink ejection control data) by the printing machine driver 76. The print control signal is supplied from the printing machine driver 76 via the I/F 78 to the printing machine 18. If necessary, the C, M, Y, K raster image data converted by the RIP 72 are temporarily stored in the storage unit 90. Thereafter, the printing machine 18 produces a desired print 34 based on the print control signal.

Since target profiles and print profiles corresponding to a plurality of set conditions have been stored in the storage unit 90, a target profile and a print profile are selectively supplied to the target profile processor 92 and the print profile processor 94, respectively, depending on various preset conditions. If the profiles are appropriately corrected in view of the print mode of the printing machine 18, then a more appropriate color conversion process can be performed.

An image processing sequence of the image processing apparatus 16 for generating a profile (step S2) will be described in detail below with reference to FIG. 5.

Image data generated by the profile data generator 98 based on given C, M, Y, K value data stored in the storage unit 90, are supplied via a path R1 shown in FIG. 5 to the printing machine driver 76, and the image data are supplied to the printing machine 18 in the same manner as printing an electronic manuscript. Color patches of a profile color chart (not shown) thus produced are measured by the colorimeter 20, which is connected to the image processing apparatus 16, thereby producing color values L*, a*, b*. The color value data are temporarily stored in the storage unit 90. Thereafter, based on the associating relationship between the designated C, M, Y, K values and the produced color values L*, a*, b*, a three-dimensional to four-dimensional conversion LUT (a portion of the data of the print profile) can be generated.

The process of producing an appropriate print 34 using the printing system 10 according to the present embodiment has been described above. Next, a process of finely adjusting a color of the print 34 will be described in detail below.

Figure 8:
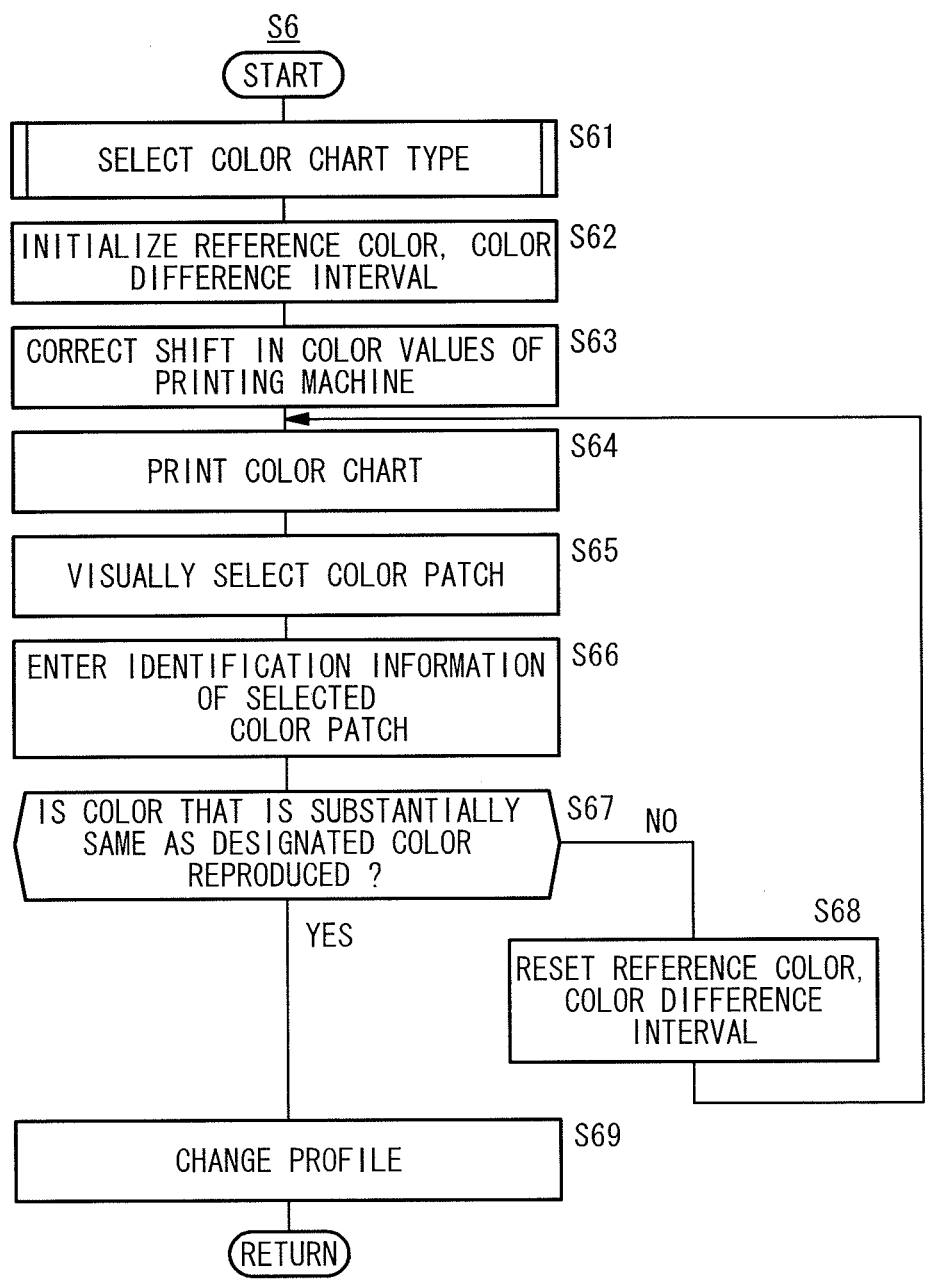
FIG. 8 is a flowchart of a process of adjusting a designated color using the color chart according to the embodiment.

FIG. 8 is a flowchart illustrative of a process of finely adjusting a color using the first, second, and third color charts 34a, 34b, 34c (step S6), i.e., FIG. 8 is a flowchart of a process of adjusting a designated color.

First, the operator selects a type of color chart (step S61). Details of the selection of a type of color chart will be described later. It is assumed that the first color chart 34a is selected and L*, a*, b* are selected as color comparing conditions.

Then, a reference color and a color difference interval of the first color chart 34a are initialized (step S62). These values can freely be set by the color chart condition setter 102 (see FIG. 5).

For example, color values corresponding to the color number of a color sample of color chips or the like may be acquired and used as the initial values of the reference color ($L^*_0$, $a^*_0$, $b^*_0$). The color values may be acquired by measuring the actual color sample with the colorimeter 20. Alternatively, color values associated with color numbers may be stored in advance in the storage unit 90, and color values corresponding to a designated color number may be read from the storage unit 90. The reference color and the color difference interval may be initialized by selecting values with a GUI controller such as a color wheel.

The color difference interval ($\Delta L^*$, $\Delta a^*$, $\Delta b^*$) may be initialized to appropriate values, which have been empirically established in color adjustment operations.

Then, a shift of the color values of the printing machine 18 is corrected (step S63). It is assumed that the colorimeter 20 produces measured values (L*(meas), a*(meas), b*(meas)) of a certain color patch 36a whose color has designed values (L*(des), a*(des), b*(des)). At this time, corrective amounts L*(diff), a*(diff), b*(diff) are calculated according to the following equations (1) through (3):

$$L^*(\text{diff}) = L^*(\text{meas}) - L^*(\text{des}) \qquad (1)$$

$$a^*(\text{diff}) = a^*(\text{meas}) - a^*(\text{des}) \qquad (2)$$

$$b^*(\text{diff}) = b^*(\text{meas}) - b^*(\text{des}) \qquad (3)$$

When the image data are generated, the corrective amounts L*(diff), a*(diff), b*(diff) are added to the designed values of the colors for thereby correcting a slight shift of a print color in order to achieve an increase in the color reproduction accuracy. In the correcting process, the print 34 may incorporate the first color chart 34a to be printed subsequently.

Then, the first color chart 34a is printed (step S64). The color patches 36a are arranged in a two-dimensional matrix on the first color chart 34a such that the values a* change vertically and the values b* change horizontally at given color difference intervals ($\Delta a^*$, $\Delta b^*$).

Specifically, color values corresponding to the respective color patches 36a may be determined according to the following equations (4) through (6):

$$L^*_i = L^*_0 + \Delta L^* \times i\,(i=-3,-2,\ldots,+2,+3) \qquad (4)$$

$$a^*_j = a^*_0 + \Delta a^* \times j\,(j=-3,-2,\ldots,+2,+3) \qquad (5)$$

$$b^*_k = b^*_0 + \Delta b^* \times k\,(k=-3,-2,\ldots,+2,+3) \qquad (6)$$

Figure 9:
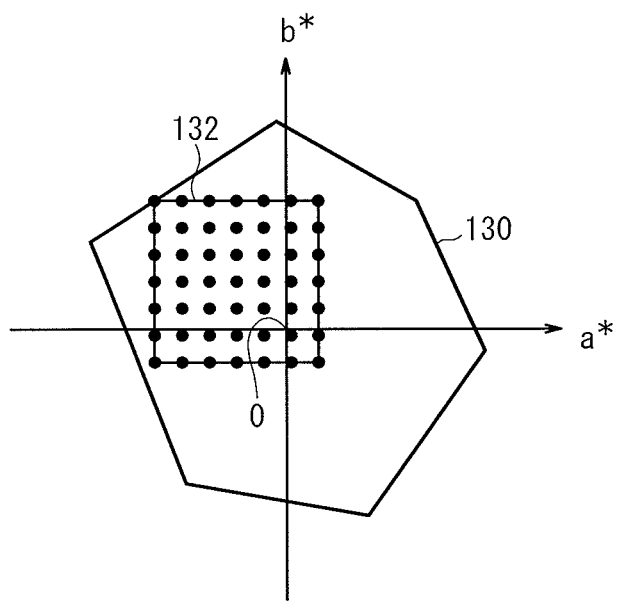
FIG. 9 is a diagram showing a presentation area formed by a first color chart according to the embodiment.

FIG. 9 is a diagram showing a presentation area of the first color chart 34a according to the present embodiment. The presentation area refers to a color area formed by the color patches 36a of the first color chart 34a.

A hexagonal area formed on the a*–b* plane, with L* being fixed, represents a gamut 130 of the printing machine 18. If the colors of the color patches 36a are plotted according to the above equations (5) and (6), for example, then the plotted points are disposed at equal intervals. At this time, the presentation area 132 corresponds to a rectangular area formed by four points $(a^*_0+3\Delta a^*, b^*_0+3\Delta b^*)$, $(a^*_0+3\Delta a^*, b^*_0-3\Delta b^*)$, $(a^*_0-3\Delta a^*, b^*_0+3\Delta b^*)$, $(a^*_0-3\Delta a^*, b^*_0-3\Delta b^*)$.

The first data generator 96a (see FIG. 5) generates image data such that the color differences between adjacent color patches 36a are at a substantially equal interval. The reference color and the color difference interval can be provided by reading data that are preset by the color chart condition setter 102 and stored in the storage unit 90.

The image data generated by the first data generator 96a are supplied via a path R2 to the print profile processor 94 as shown in FIG. 3. The image data are supplied from the print profile processor 94 to the printing machine 18 in the same manner as when an electronic manuscript is printed. The color patches 36a of the first color chart 34a (see FIG. 2) substantially reproduce the pre-designed color $(L^*, a^*, b^*)$.

The image data used to print the first color chart 34a are not limited to raster image data such as TIFF or bitmap data, but may be PDL-format image data such as PDF or PostScript (registered trademark) data.

The second and third color charts 34b, 34c are the same as the first color chart 34a except that their image data are generated by the second and third data generators 96b, 96c, respectively.

Then, the operator selects one of the color patches 36a of the printed first color chart 34a (step S65). Specifically, the operator visually compares a color sample representing a designated color serving as a target (e.g., a color chip or a color displayed by the display device 24) with the first color chart 34a, and selects one of the color patches 36a whose color is closest to the designated color.

Since the colors of the color patches 36a are provided according to the equations (4) through (6), the operator visually recognizes change of the colors of the color patches 36a at substantially equal intervals when the operator visually observes the first color chart 34a. Thus, the operator can easily select a color patch 36a whose color is closest to the designated color.

Then, the operator enters the identification information of the selected color patch 36a (step S66). Specifically, the operator enters numerical values (see FIG. 2) represented by the row number 38 and the column number 40 which correspond to the position of the selected color patch 36a, using the input device 26 through an unillustrated setting screen.

Then, the operator determines whether a color that is substantially the same as the designated color has been reproduced by the selected color patch 36a (step S67). If the operator judges that a color that is substantially the same as the designated color has not been reproduced, but there is still a possibility of selection, then the operator resets a next reference color and color difference interval (step S68). Thereafter, another first color chart 34a is printed based on the reset reference color and color difference interval.

The above process is repeated until a color that is identical to the designated color is reproduced on the first color chart 34a (steps S64 through S68). Subsequently, the profile is updated (step S69), and the process of adjusting the designated color is completed.

Figure 10:
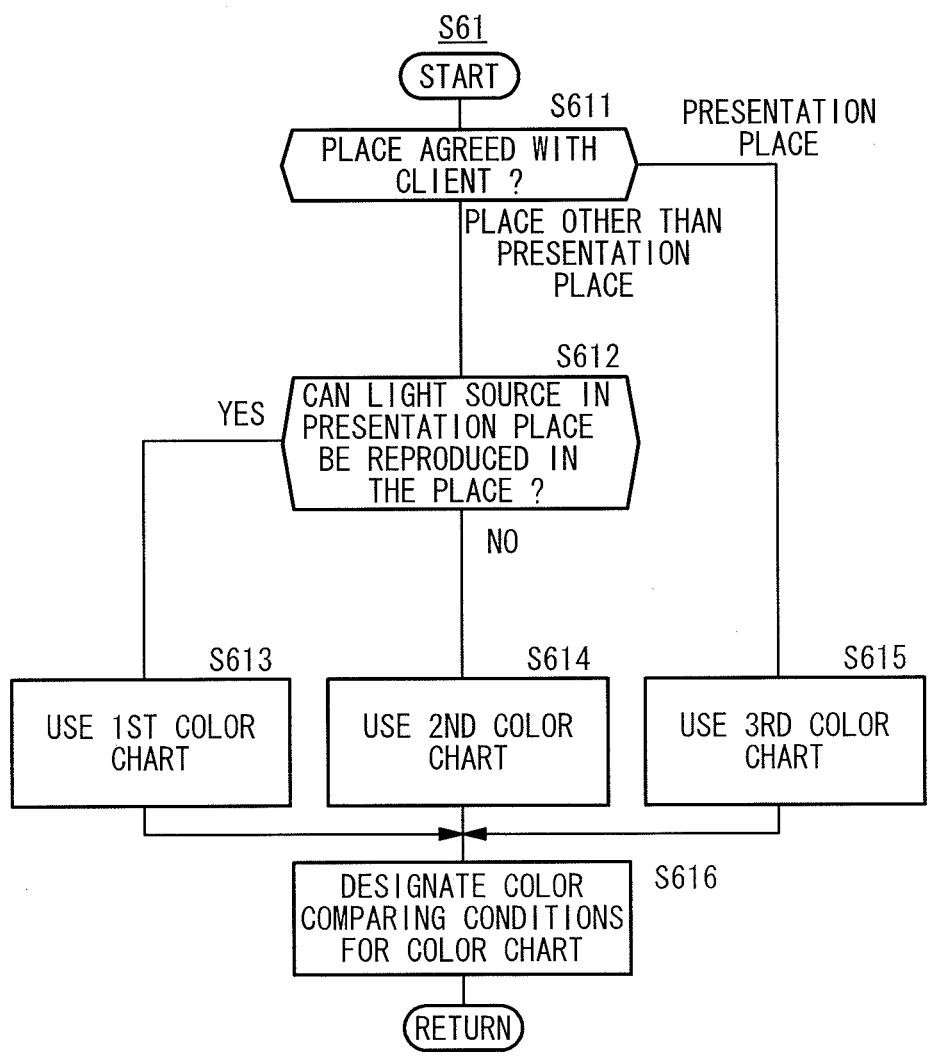
FIG. 10 is a flowchart of a process of selecting one of the types of color charts according to the embodiment.

FIG. 10 is a flowchart of a process (step S61) of selecting one of the types of the first, second, and third color charts 34a, 34b, 34c.

For determining a designated color, a place which has been agreed between the operator and the client is confirmed (step S611). The agreement is reached between the operator and the client as a result of an actual visual check of a color sample of color chips or the like.

If the agreed place is not the presentation place, but is a printing site or a business place, then it is confirmed whether or not the observational environment (the light source DS) for the presentation place of the print 34 can be reproduced in the printing site or the business place (step S612). If the light source DS can be reproduced, then the first color chart 34a is used (step S613). If the light source DS cannot be reproduced, then the second color chart 34b is used (step S614).

If the agreed place is the presentation place (i.e., the environment under the light source DS), then the third color chart 34c is used (step S615).

Thereafter, appropriate color comparing conditions are designated depending on the determined one of the types of the first, second, and third color charts 34a, 34b, 34c (step S616).

More specifically, the operator selects one of the types of the color charts using one of the radio buttons 114a through 114e in the setting screen 110 shown in FIG. 6. For example, if the first color chart 34a shown in FIG. 2 is to be used, then the operator selects the radio button 114b. If the second color chart 34b shown in FIG. 3 is to be used, then the operator selects the radio button 114c. If the third color chart 34c shown in FIG. 4 is to be used, then the operator selects the radio button 114d.

If "CMYK VALUES" indicated by the radio button 114a is selected, then a color chart, not shown, in which the differences between the pixel values of the C, M, Y, K values of adjacent color patches are of equal intervals, is printed. If "MAPPING PROCESS" indicated by the radio button 114e is selected and if the designated color is a color outside the gamut 130, then a color chart (not shown) for comparing colors produced by a plurality of mapping processes in order to replace the designate color with a color within the gamut 130, is printed.

The mapping processes include "LIGHTNESS MATCHING", "LIGHTNESS PRIORITY", "SATURATION MATCHING", "SATURATION PRIORITY", "MINIMUM DISTANCE", AND "IMPRESSION MATCHING".

A gamut mapping for printing one of various color charts (either one of the color charts corresponding to the radio buttons 114a through 114d in FIG. 6) can be selected from the pull-down menu 112.

In this manner, the color comparing condition designator 104 designates a type of color chart and color comparing conditions via the setting screen 110. Next, specific processes (step S65 in FIG. 8) for selecting one of the color patches 36a, 36b, 36c from the first, second, and third color charts 34a, 34b, 34c will be described in detail below.

The specific process for selecting one of the color patches 36a from the first color chart 34a has been described above. If the observational environment has little effect for the reason that the observational environment including the observational light source DS can be essentially reproduced, then it is preferable to provide color patches 36a whose colors are represented by gradually changing variables (C, M, Y, K or $L^*, a^*, b^*$ or the like) that can be controlled for print, and to select one of the colors that is closest to the designated color. In this case, it is appropriate to select the first color chart 34a.

A specific process for selecting one of the color patches 36b from the second color chart 34b will be described below.

First, the color temperature of the observational light source at the printing site is checked. For example, it is assumed that the color temperature is 6500K.

At this time, a color that is closest to the designated color is selected from the 9 color patches 36b which belong to the vertical column indicated by "6500K" in the string of characters 50 shown in FIG. 3. It is assumed that a color patch 36b at "0" (on the string of numbers 46) of "LIGHTNESS" (the string of characters 42) is selected.

When the color temperature of the light source DS in the presentation place is "2800K", it is equivalent to the selection of a color patch 36*b* at "0" of "LIGHTNESS" on the vertical column indicated by "2800K" in the string of characters 50. The color may be finely adjusted such that the color (whose lightness is "0") corresponding to the color temperature of 2800K under the light source DS in the presentation place is associated with the designated color. In other words, the patch color converter 106 (see FIG. 5) converts the color of the color patch 36*b* selected under the light source PS of the printing system 10 into the color of the color patch 36*b* under the light source DS in the presentation place (i.e., a color to be selected under the light source DS), based on color temperature information of the observational light source DS that has been acquired in advance.

In this manner, the appearance of the color in the printing site (under the light source PS) and the appearance of the color in the presentation place (under the light source DS) can be confirmed by way of visual inspection of one color chart (second color chart 34*b*). It is appropriate to select the second color chart 34*b* if change in the appearance of the printed color under different observational light sources DS and the tendency of such change need to be recognized by the operator.

A specific process for selecting one of the color patches 36*c* from the third color chart 34*c* will be described below.

Figure 11:
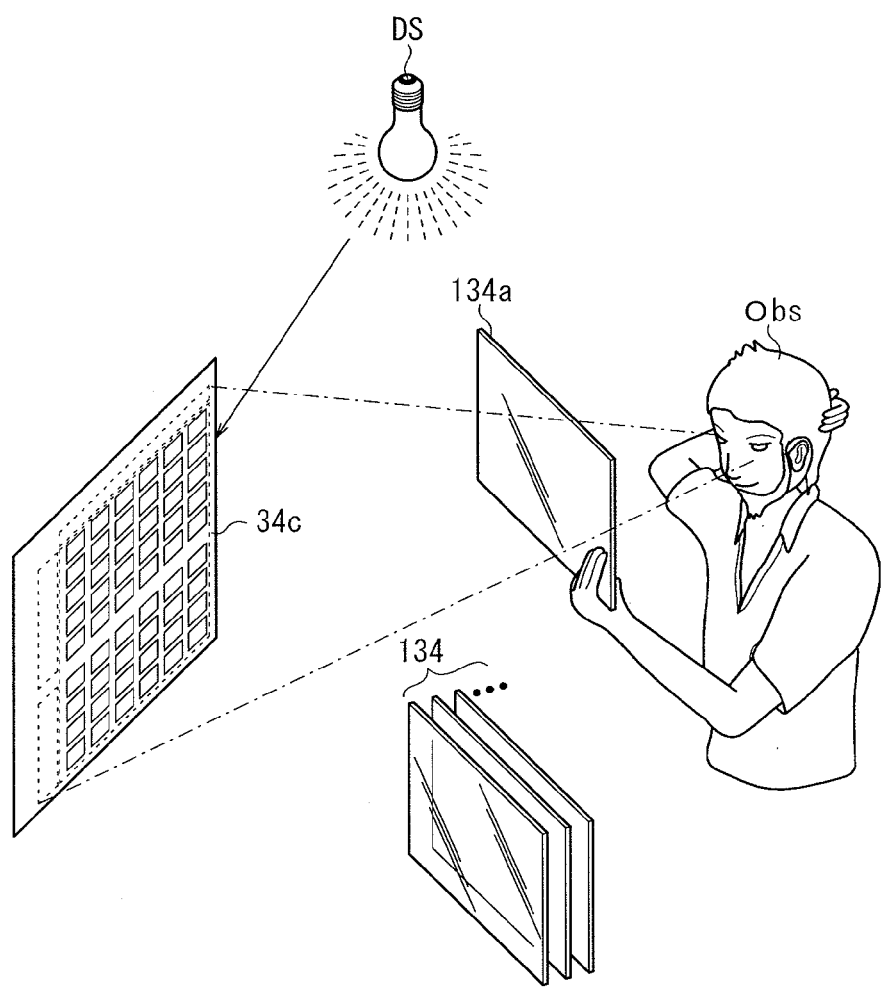
FIG. 11 is a perspective view illustrative of a process of quantifying the difference between the appearances of images with an observational light source and a standard light source, using color correction filters.

FIG. 11 is a perspective view illustrative of a process of quantifying the difference between the appearances of colors of images with the observational light source DS and the standard light source (D50), using color correction filters 134 (color correction optical filters).

The third color chart 34*c* has its colors adjusted to provide a suitable gradation under the observational light source (D50 light source). If the light source DS in the presentation place is not the D50 light source, then the appearance of colors is shifted.

In FIG. 11, the observer Obs, i.e., the operator, confirms the colors of the image of the third color chart 34*c* through a color correction filter 134*a*, which is held by the observer Obs at a position between the eyes of the observer Obs and the third color chart 34*c*.

If the observer Obs judges that the third color chart 34*c* does not have a color patch 36*c* whose color is substantially the same as the designated color, then the observer Obs replaces the color correction filter 134*a* with another color correction filter 134 having a different frequency pass band, and similarly observes the third color chart 34*c*.

The observer Obs repeatedly uses various color correction filters 134 and observes the third color chart 34*c* through those color correction filters 134 until the observer Obs finds and selects a color correction filter 134 through which the observer Obs observes the most appropriate colors of the third color chart 34*c*.

The observer Obs may select not only one color correction filter 134, but also two or more color correction filters 134 having identical or different frequency pass bands, for use in superposition.

The color correction filters 134 perform a function to freely adjust the range of the presentation area 132 (see FIG. 9) of the color patches 36*c* visually recognized by the observer Obs. For example, if the color difference corresponding to one-half of the color difference interval is shifted, then a color between adjacent color patches 36*c* can be simulated. If the color difference is shifted greatly, then the range of the presentation area 132 can be moved without increasing the number of color patches 36*c* and the color difference interval thereof.

It is preferable to observe the gray patch 62 (see FIG. 4) in the lower portion of the third color chart 34*c* and select a color correction filter 134 through which the color of the gray patch 62 can be visually recognized as a more neutral gray. This is because the human eye is more sensitive to color differences between achromatic colors than between chromatic colors.

By thus observing the third color chart 34*c* through color correction filters 134 under the light source DS and recognizing an appropriate color correction filter 134 in advance, color correction based on such an appropriate color correction filter 134 can be reflected in the adjusted color. In other words, using the known spectral transmittance of the selected color correction filter 134, it is possible to predict color values such as L*, a*, b*, or X, Y, Z, or the like under the light source DS with respect to spectral data of the standard light source (D50 light source).

According to the above embodiment, the first, second, and third color charts 34*a*, 34*b*, 34*c* have been described above. According to the present invention, various color charts for use in different situations and uses can be printed. Modifications of the first color chart 34*a* will be described below.

FIGS. 12A through 12D shows a first modification of the first color chart 34*a*. According to the first modification, the first color chart 34*a* is different from the first color chart 34*a* according to the above embodiment as to the sequence of color patches 36*a*.

Specifically, the color patches 36*a* are arranged on the flat print medium 32 to keep the colors of adjacent ones of the color patches 36*a* continuous while changing the three-dimensional variables L*, a*, b*.

FIGS. 12A and 12B are diagrams showing the layouts of the color patches 36*a* on the first color chart 34*a*. Though the color patches 36*a* are actually spaced apart in the manner shown in FIG. 2, they are shown as being closely positioned without any gaps therebetween for illustrative purposes. The characters shown in each of the cells, e.g., "A-4" in the cell at the upper left corner of the matrix shown in FIG. 12A, represent the attributes of the color of the color patch 36*a* corresponding to the cell.

FIGS. 12C and 12D are diagrams showing the design values of the colors of the respective color patches 36*a*. The design values represent the values of deviations (L*(dev), a*(dev), b*(dev)) from the reference color (L*, a*, b*).

Characters 136 (A through D) shown in FIG. 12C correspond to alphabetical letters of the characters in the cells shown in FIGS. 12A and 12B, e.g., "A" shown in FIG. 12C corresponds to "A" of the characters "A-4" in the cell at the upper left corner of the matrix shown in FIG. 12A. Characters 138 (1 through 9) shown in FIG. 12D correspond to numbers of the characters in the cells shown in FIGS. 12A and 12B, e.g., "4" shown in FIG. 12D corresponds to "4" of the characters "A-4" in the cell at the upper left corner of the matrix shown in FIG. 12A.

A specific example of the sequence of colors shown in FIG. 12A will be described in detail below with reference to FIGS. 12C and 12D.

As shown in FIG. 12A, the matrix of color patches 36*a* has its colors defined according to the sequence "A-1", "A-2", ..., "A-9", "B-1", "B-2", ..., "D-8", "D-9" (see the directions of arrows extending from cells to cells). For example, the cells whose characters 136 represent "A" are localized in an upper left area (a small matrix of 3×3) of the matrix of 6×6.

As shown in FIG. 12C, if the characters 136 represent "A", then L*(dev) represents 0. The characters 138 ranging from "1" through "9" are associated respectively with the deviations (a*(dev), b*(dev)) for the cells according to the rules shown in FIGS. 12D, and colors associated with the cells are accordingly determined. In other words, the colors are arranged in a zigzag pattern such that a* and b* are gradually changed while the lightness is fixed (L*).

The cells whose characters 136 represent "B" are localized in an upper right area (a small matrix of 3×3) of the matrix of 6×6. The deviation L*(dev) of the lightness in those cells represents ΔL*. As with the above example wherein the characters 136 represent "A", the colors are arranged in a zigzag pattern such that a* and b* are gradually changed while the lightness is fixed (L*−ΔL*).

The pattern of the deviations of a* and b* (two-dimensional variables) is used as one period, and the deviation of L* (one-dimensional variable) is gradually changed in each period to keep the colors of adjacent color patches 36a continuous.

With the color patches 36a whose colors are gradually changed being arranged in a zigzag pattern, it is possible to track down the colors that are arranged in a continuous pattern, making it easy to look for a color close to the color which the operator is currently observing. The first modification is preferable as it allows the operator to select a color closest to the designated color from the color patches 36a more easily.

As shown in FIG. 12B, the colors whose characters 136 represent "A", "B", "C", and "D" may be arranged in sequences along one direction.

FIGS. 13A through 13C show a second modification of the first color chart 34a. The second modification is different from the first modification as to the sequence of the colors of the color patches 36a. The definition of the cells and characters associated therewith shown in FIGS. 13A through 13C are identical to those shown in FIGS. 12A, 12C, and 12D and will not be described in detail below.

A specific example of the sequence of colors shown in FIG. 13A will be described in detail below with reference to FIGS. 13B and 13C.

As shown in FIG. 13A, the matrix of color patches 36a has its colors defined according to the sequence "A-1", "A-2", . . . , "A-4", "B-1", "B-2", . . . , "I-3", "I-4" (see the directions of arrows extending from cells to cells). For example, the cells whose characters 136 represent "A" are localized in an upper left area (a small matrix of 2×2) of the matrix of 6×6.

As shown in FIG. 13B, if the characters 136 represent "A", then the deviations (a*(dev), L*(dev)) represent (Δa*, ΔL*). The characters 138 ranging from "1" through "4" are associated with the deviation b*(dev) for the cells according to the rules shown in FIG. 12C, and colors associated with the cells are accordingly determined. In other words, the colors are arranged in a zigzag pattern such that b* is gradually changed while a* and L* are fixed (a*+Δa*, L*+ΔL*).

The cells whose characters 136 represent "B" are localized in an upper central area (a small matrix of 2×2) of the matrix of 6×6. The deviations (a*(dev), L*(dev)) in those cells represent (0, ΔL*). As with the above example wherein the characters 136 represent "A", the colors are arranged in a zigzag pattern such that b* is gradually changed while a* and L* are fixed (a*, L*+ΔL*).

The pattern of the deviation of b* (one-dimensional variable) is used as one period, and the deviations of L*, a* (two-dimensional variables) are gradually changed in each period to keep the colors of adjacent color patches 36a continuous.

Figure 14:
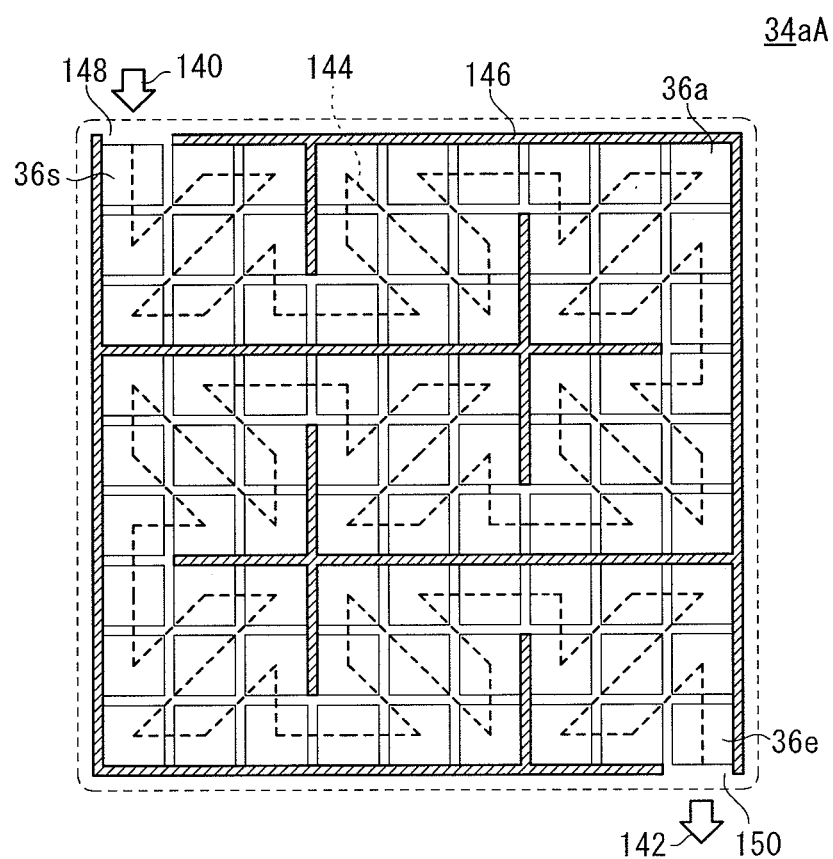
FIG. 14 is a front elevational view of a first color chart according to a third modification of the embodiment.

FIG. 14 shows a third modification of the first color chart 34a. A first color chart 34aA according to the third modification is different from the above embodiment and the first and second modifications as to the number of color patches 36a and plotting specifications.

As shown in FIG. 14, the first color chart 34aA includes 81 color patches 36a. As with the first and second modifications (see FIGS. 12A through 12C, etc.), the color patches 36a have their colors defined in a predetermined sequence such that the colors of the color patches 36a are gradually changed. In FIG. 14, a color patch 36s corresponding to a starting color is positioned at an upper left corner of the matrix and a color patch 36e corresponding to an ending color is positioned at a lower right corner of the matrix.

To indicate the starting color and the ending color to the operator, the first color chart 34aA also includes arrows 140, 142 printed thereon which are oriented to the color patches 36s, 36e, respectively.

An observational route 144 which corresponds to a predefined sequence of colors, is established along the broken lines, and has a zigzag pattern as is the case with the first and second modifications (see FIGS. 12A and 13A).

Guide lines 146 which extend according to predetermined rules are disposed along some of the color patches 36a. The guide lines 146 allow the operator to observe the color patches 36a along the observational route 144.

The guide lines 146 include a gap 148 above the color patch 36s at the starting color and a gap 150 beneath the color path 36e at the ending color. As the guide lines 146 with the gaps 148, 150 resemble a maze with an entrance and an exit, the operator can visually recognize the observational route 144 with intuition.

In the example shown in FIG. 14, the guide lines 146 with the gaps 148, 150 serve to guide the operator to follow the observational route 144 for the color patches 36a. The observational route 144 may actually be printed as part of the first color chart 34aA if it will not adversely affect the process of comparing colors.

Figure 15:
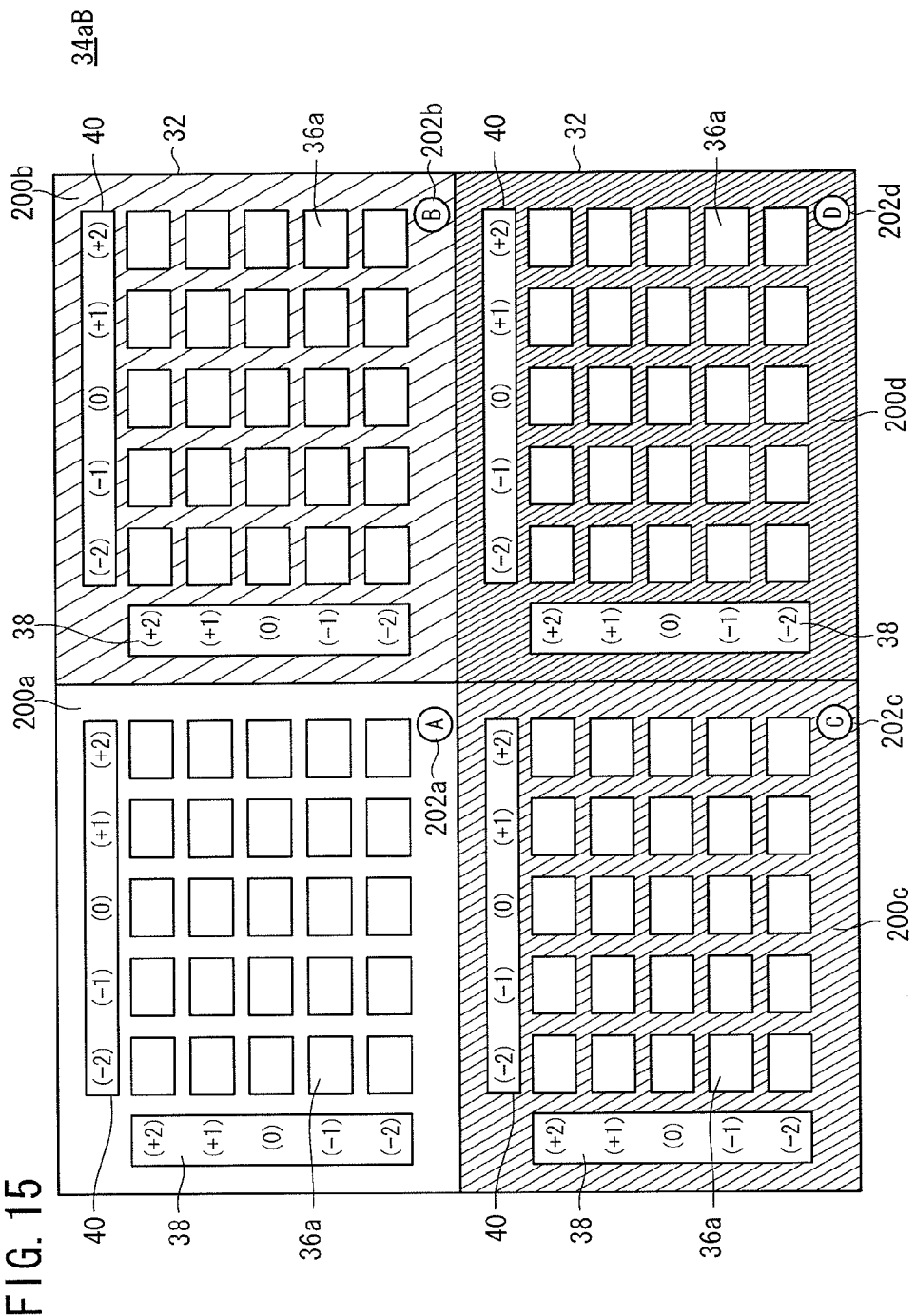
FIG. 15 is a front elevational view of a first color chart according to a fourth modification of the embodiment.

FIG. 15 shows a fourth modification of the first color chart 34a. A first color chart 34aB according to the fourth modification is different from the above embodiment and the first through third modifications as to portions of the background color.

As shown in FIG. 15, the first color chart 34aB comprises four color charts printed on a print medium 32, i.e., a color chart 200a in an upper left area thereof, a color chart 200b in an upper right area thereof, a color chart 200c in a lower left area thereof, and a color chart 200d in a lower right area thereof.

The color chart 200a includes 25 color patches 36a arranged in a matrix of 5 rows and 5 columns, row numbers 38, and column numbers 40. The row numbers 38, the column numbers 40, and the colors of the color patches 36a are the same as those of the first color chart 34a shown in FIG. 2, and will not be described in detail below. The color chart 200a has a background that is not colored at all, and also includes a letter 202a representing "A" printed at a lower right corner of the color chart 200a.

The color chart 200b is substantially identical in layout to the color chart 200a except that the color chart 200b has a background that is colored in a pale color and includes a letter 202b representing "B" printed at a lower right corner of the color chart 200b.

The color chart 200c is substantially identical in layout to the color chart 200b except that the color chart 200c has a background that is colored in a similar color darker than the background of the color chart 200b and includes a letter 202c representing "C" printed at a lower right corner of the color, chart 200c.

The color chart 200d is substantially identical in layout to the color chart 200c except that the color chart 200d has a background that is colored in a similar color darker than the background of the color chart 200c and includes a letter 202d representing "D" printed at a lower right corner of the color chart 200d.

The backgrounds of the color charts 200a, 200b, 200c, 200d are colored in similar colors of different densities. The background colors can freely be set via a setting screen, not shown. For example, the background colors should preferably be set based on R, G, B values, C, M, Y, K values, L*, a*, b* values, or the like.

Accordingly, the designated color can be adjusted in view of a change of spectral sensitivity characteristics of vision depending on the background color (so-called "chromatic adaptation").

The present invention is not limited to the above embodiment. Rather, changes and modifications can be made without departing from the scope of the invention.

In the above embodiment, color chart conditions (reference colors and color difference intervals) are automatically set by the color chart condition setter 102. However, specification changes may be made in view of the preferences of the operator or client as to color selections.

Specifically, a setting screen, not shown, may include text boxes which display recommended values set by the color chart condition setter 102. The operator may change the displayed values and set the changed values using the keyboard 28, etc. The operator may freely change the number of color patches 36a, 36b, 36c.

In the above embodiment, the printing machine 18 comprises an inkjet printing apparatus. However, the printing machine 18 may comprise an electrophotographic apparatus, a thermosensitive apparatus, or the like.

Although certain preferred embodiments of the present invention have been shown and described in detail, it should be understood that various changes and modifications may be made therein without departing from the scope of the appended claims.

What is claimed is:

1. An image processing method comprising the steps of:
designating a color comparing condition for a color chart having a plurality of color patches;
generating image data to print the color chart in which color patches having colors corresponding respectively to different variables of the designated color comparing condition are disposed adjacent to each other;
printing the color chart with a printing machine based on the generated image data;
entering color values of a designated color; and
converting colors of a print to be produced by the printing machine, based on color values of one of the color patches whose color is selected as a color closest to the designated color from the printed color chart and based on the entered color values of the designated color;
wherein the color comparing condition includes a type of observational light source, and
wherein the one of the color patches whose color is closest to the designated color is selected under a predetermined observational light source from those of the color patches in the color chart which correspond to the type of the predetermined observational light source.

2. A color selecting method of printing a color chart having a plurality of color patches with a printing machine and selecting one of the color patches whose color is closest to a designated color from the color chart, comprising the steps of:
designating a color comparing condition for the color chart; and
generating image data to print the color chart in which color patches having colors corresponding respectively to different variables of the designated color comparing condition are disposed adjacent to each other;
wherein the color comparing condition includes a type of observational light source, and
wherein the one of the color patches whose color is closest to the designated color is selected under a predetermined observational light source from those of the color patches in the color chart which correspond to the type of the predetermined observational light source.

3. A color selecting method according to claim 2, wherein the color comparing condition includes a background color.

4. A color selecting method according to claim 2, wherein the color comparing condition includes lightness, saturation, and hue.

5. A color selecting method according to claim 2, wherein the color comparing condition includes a gamut mapping process.

6. A color selecting method according to claim 2, wherein the step of generating image data generates the image data such that the color patches having colors gradually changed are disposed in a zigzag pattern.

7. A color selecting method according to claim 6, wherein the step of generating image data generates the image data so as to include a guide line for observing the color patches along a route according to the zigzag pattern.

8. An image processing method using a color selecting method of printing a color chart having a plurality of color patches with a printing machine and selecting one of the color patches whose color is closest to a designated color from the color chart, the color selecting method including the steps of:
designating a color comparing condition for the color chart;
generating image data to print the color chart in which color patches having colors corresponding respectively to different variables of the designated color comparing condition are disposed adjacent to each other;
printing the color chart after a color conversion thereof depending on a predetermined light source has been performed; and
observing the color chart through color correction optical filters under an observational light source different from the predetermined light source, and selecting the one of the color patches whose color is closest to the designated color and selecting one of the color correction optical filters,
wherein the color comparing condition includes a type of observational light source,
the image processing method comprising the steps of:
converting color values of the selected one of the color patches whose color is closest to the designated color into color values under the observational light source different from the predetermined light source, based on color information of the selected one of the color correction optical filters;
entering color values of the designated color; and
converting colors of a print to be produced by the printing machine, based on the color values under the observational light source different from the predetermined light source and based on the entered color values of the designated color.

9. An image processing apparatus comprising:
a designator for designating a color comparing condition for a color chart having a plurality of color patches;

a data generator for generating image data to print the color chart in which color patches having colors corresponding respectively to different variables of the color comparing condition designated by the designator are disposed adjacent to each other;

a print controller for controlling a printing machine to print the color chart based on the image data generated by the data generator; and a color converter for converting colors of a print to be produced by the printing machine, based on color values of one of the color patches whose color is selected as a color closest to the designated color from the printed color chart and based on the entered color values of the designated color;

wherein the color comparing condition includes a type of observational light source, and wherein the one of the color patches whose color is closest to the designated color is selected under a predetermined observational light source from those of the color patches in the color chart which correspond to the type of the predetermined observational light source.

10. An image processing apparatus using a color selecting method of printing a color chart having a plurality of color patches with a printing machine and selecting one of the color patches whose color is closest to a designated color from the color chart, the color selecting method including the steps of:

designating a color comparing condition for the color chart;

generating image data to print the color chart in which color patches having colors corresponding respectively to different variables of the designated color comparing condition are disposed adjacent to each other;

printing the color chart after a color conversion thereof depending on a predetermined light source has been performed; and observing the color chart through color correction optical filters under an observational light source different from the predetermined light source, and selecting the one of the color patches whose color is closest to the designated color and selecting one of the color correction optical filters, wherein the color comparing condition includes a type of observational light source, the image processing apparatus comprising:

a patch color converter for converting color values of the one of the color patches whose color is closest to the designated color and which is selected by the color selecting method, into color values under the predetermined light source, based on color information of the selected one of the color correction optical filters; and a color converter for converting colors of a print to be produced by the printing machine, based on the color values under the observational light source different from the predetermined light source which are converted by the patch color converter and based on the entered color values of the designated color.

11. A non-transitory recording medium storing a program for enabling a computer to perform the functions of:

designating a color comparing condition for a color chart;

generating image data to print the color chart in which color patches having colors corresponding respectively to different variables of the designated color comparing condition are disposed adjacent to each other; and printing the color chart based on the image data;

wherein the color comparing condition includes a type of observational light source, and wherein the one of the color patches whose color is closest to the designated color is selected under a predetermined observational light source from those of the color patches in the color chart which correspond to the type of the predetermined observational light source.

* * * * *